Feb. 3, 1925.

C. R. DUMBLE ET AL 1,525,121

PNEUMATIC CARRIER ASSORTING DEVICE

Filed Dec. 22, 1921     4 Sheets-Sheet 1

Inventors
Clifford R. Dumble,
August Koenig,
by their attys.

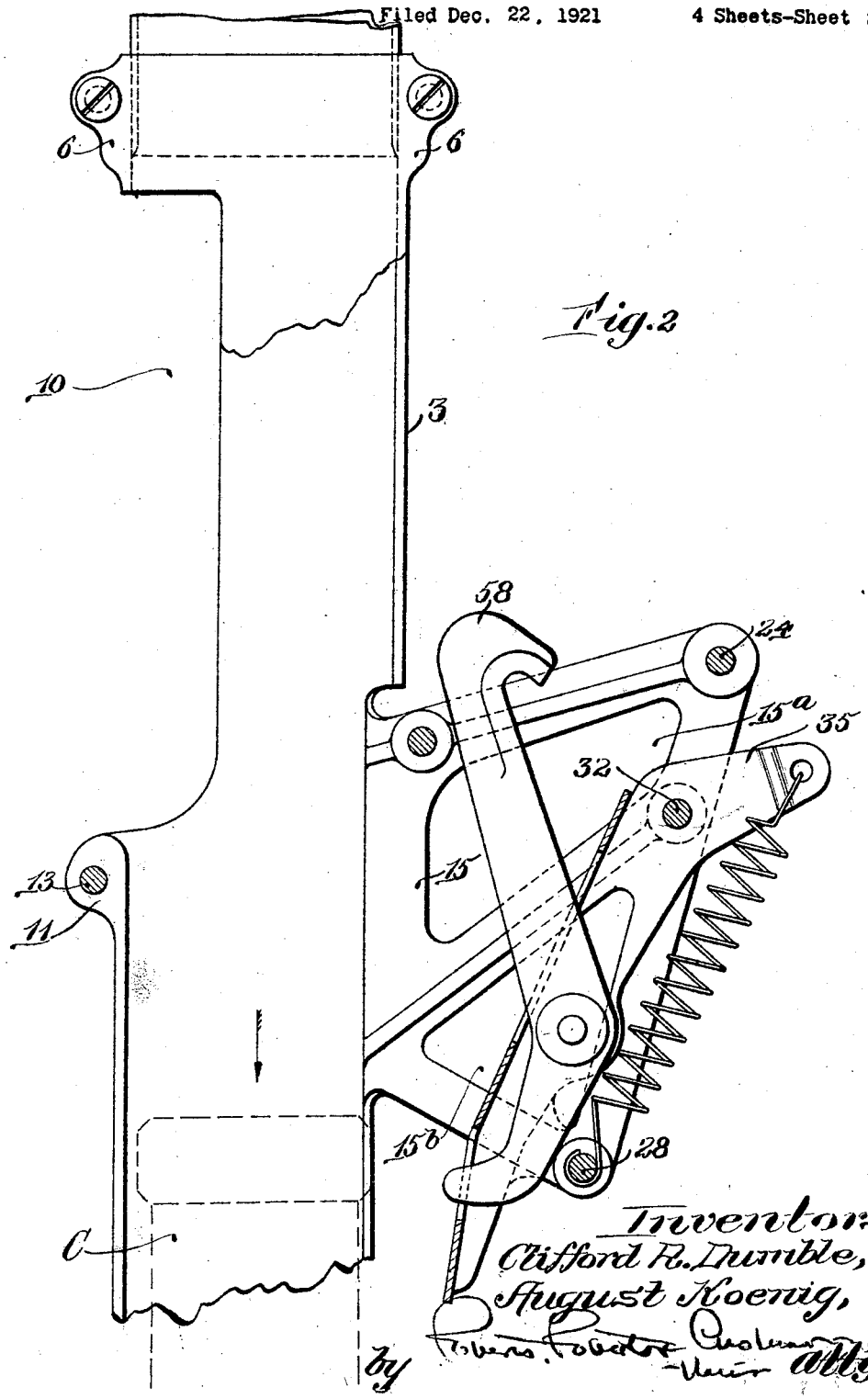

Feb. 3, 1925.            1,525,121
C. R. DUMBLE ET AL
PNEUMATIC CARRIER ASSORTING DEVICE
Filed Dec. 22, 1921    4 Sheets-Sheet 3
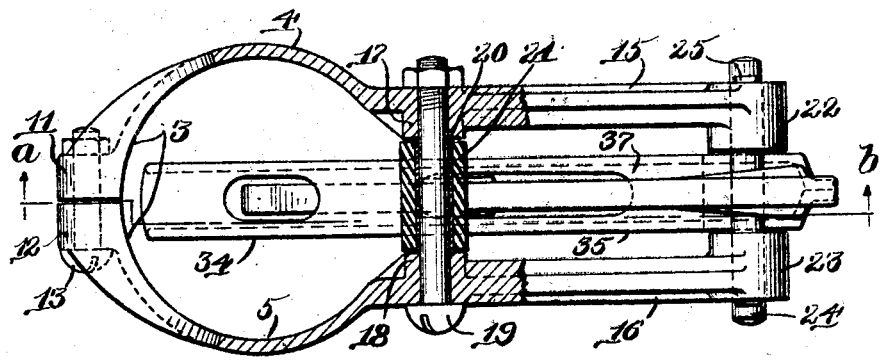
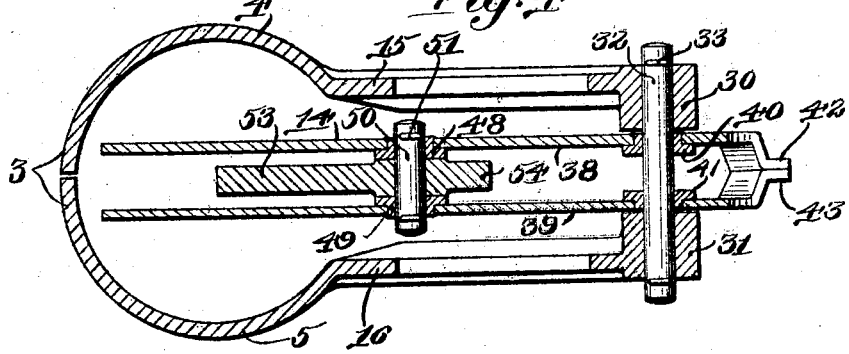
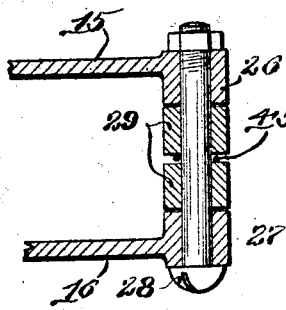
Inventors
Clifford R. Dumble,
August Koenig,
by their Atty's.

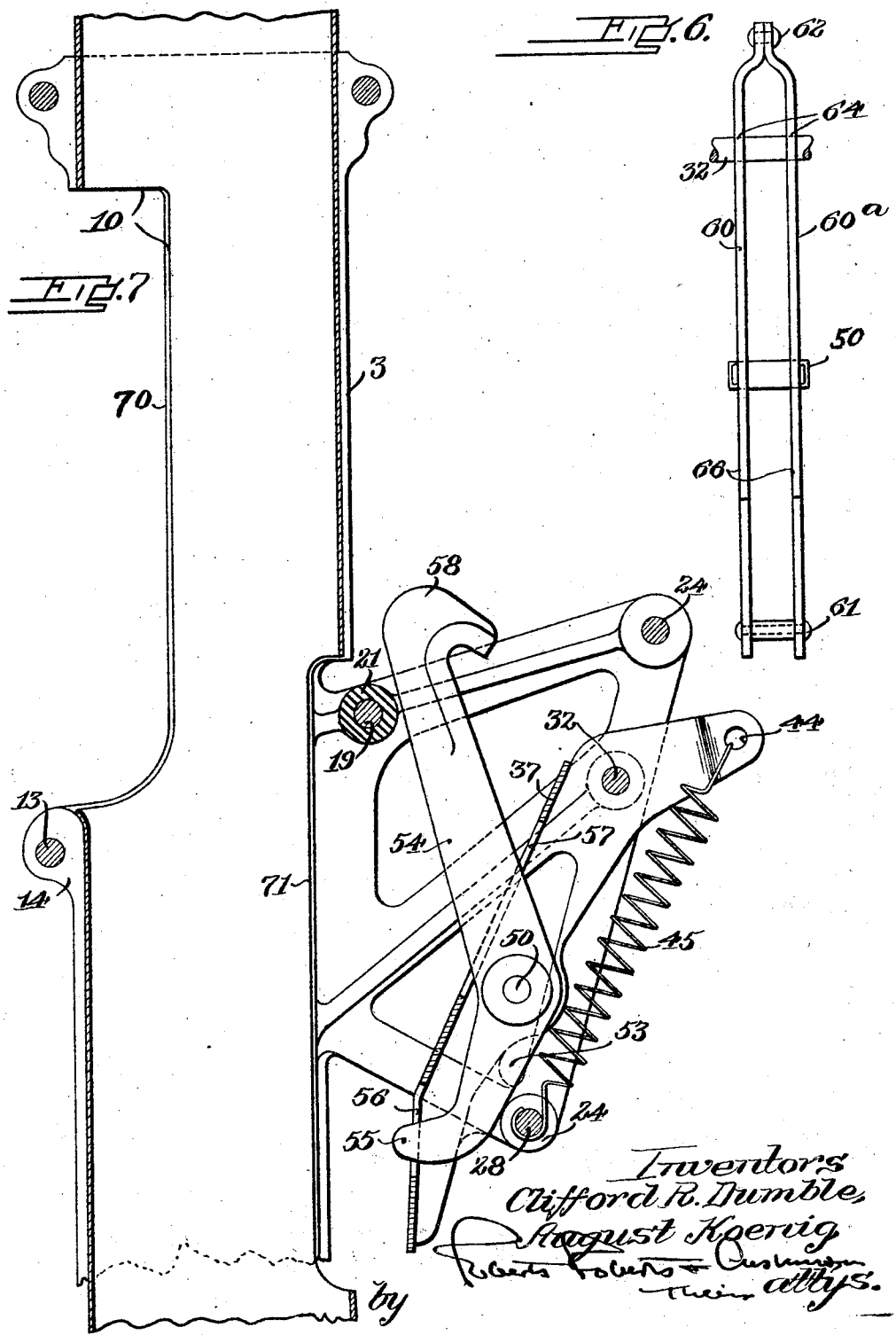

Patented Feb. 3, 1925.

1,525,121

UNITED STATES PATENT OFFICE.

CLIFFORD R. DUMBLE, OF ARLINGTON HEIGHTS, AND AUGUST KOENIG, OF LOWELL, MASSACHUSETTS, ASSIGNORS, BY MESNE ASSIGNMENTS, TO THE LAMSON COMPANY, OF BOSTON, MASSACHUSETTS, A CORPORATION OF MASSACHUSETTS.

PNEUMATIC-CARRIER-ASSORTING DEVICE.

Application filed December 22, 1921. Serial No. 524,206.

*To all whom it may concern:*

Be it it known that we, CLIFFORD R. DUMBLE and AUGUST KOENIG, citizens of the United States, and residents of Arlington Heights and Lowell, respectively, both in the county of Middlesex and State of Massachusetts, have invented new and useful Improvements in Pneumatic-Carrier-Assorting Devices, of which the following is a specification.

This invention relates to selector, assorting or separating devices adapted to separate moving articles or bodies into different classes, for example, devices for assorting carriers moving in carrier despatch systems so that one class of carrier takes one path and another class takes another path. For instance, in pneumatic despatch tube systems, one class of carrier may be employed for cash transactions and a carrier of another class may be employed for credit transactions, and it may be desired to provide for delivering these classes of carriers to different destinations.

There have been sundry prior proposals of devices for this general purpose, none of which is altogether satisfactory in respect to compactness, simplicity, and durability, or the certainty of operation and low cost connoted by these qualities.

In devices of the character to which the present invention relates, certainty of operation under all conditions is of primary importance, since any failure of the separating devices properly to assort incoming carriers results in substantial delay, with consequent annoyance to the customer and possible loss of trade. On the other hand, the conditions under which such separating devices must operate vary widely. If, for example, such a separating device be located at the lower end of a long and straight run of tube, coming perhaps from an upper floor of the building, the velocity of approach of carriers entering the device may vary greatly with varying contents, while on the other hand if arranged in a tube having many turns, or of short length, the separator may be called upon to sort carriers moving with very little energy. The weight of the carriers varies considerably, in accordance with the character of the enclosed material; a carrier containing silver money, for instance, is much heavier than one containing a credit voucher. Since under these conditions the momentum of the oncoming carriers may be very great or very small, the assorting devices must be substantial and capable of withstanding repeated heavy shocks, as well as sensitively accurate in operation. To be successful, therefore, such a mechanism must be strong, simple, and equally capable of assorting heavy or light carriers approaching at any speed.

An object therefore of the present invention is to provide an improved and simplified separating mechanism having but few moving parts, which can be applied without change in widely differing situations, and which is accurate, positive in operation under all ordinary conditions, and capable of diverting a carrier from its normal path by its own energy of movement (and therefore capable of acting on the carriers with a force varying with their differing masses) without the assistance of external forces. Further objects are to improve the construction of automatic separator devices for carriers so that they will be strong enough to stand the repeated shocks of continued use, and to provide a durable, strong and simple mechanism which can be installed at any desired point in a pneumatic tube for the purpose of ejecting therefrom carriers of one class without interference with the proper passage of carriers of another class therethrough; and without necessitating material modifications in the tube line so equipped.

In carrying this invention into effect a tubular supporting structure adapted to be substituted for a like length of the ordinary pneumatic tube is preferably provided, such structure having a carrier passage continuing the tube line, a discharge opening at one side, and providing a mounting for the parts of the mechanism about to be described, adapted to pass a carrier of one configuration without altering its path, and to eject carriers of another configuration through a lateral discharge opening.

In the accompanying drawings there is shown by way of example, one embodiment of means suitable for carrying the above object into effect.

Fig. 2 is a view similar to Fig. 1 but showing the operative mechanism as positioned when permitting the uninterrupted passage of a carrier;

Fig. 3 is a horizontal cross section on line c, d of Fig. 1;

Fig. 4 is a similar cross section on line e, f of Fig. 1;

Fig. 5 is a fragmentary detail cross section on line g, h of Fig. 1;

Fig. 6 is a detail elevation partly broken away showing a modified form of abutment lever; and Fig. 7 is a vertical cross section showing a modified application of the device.

Figure 1:
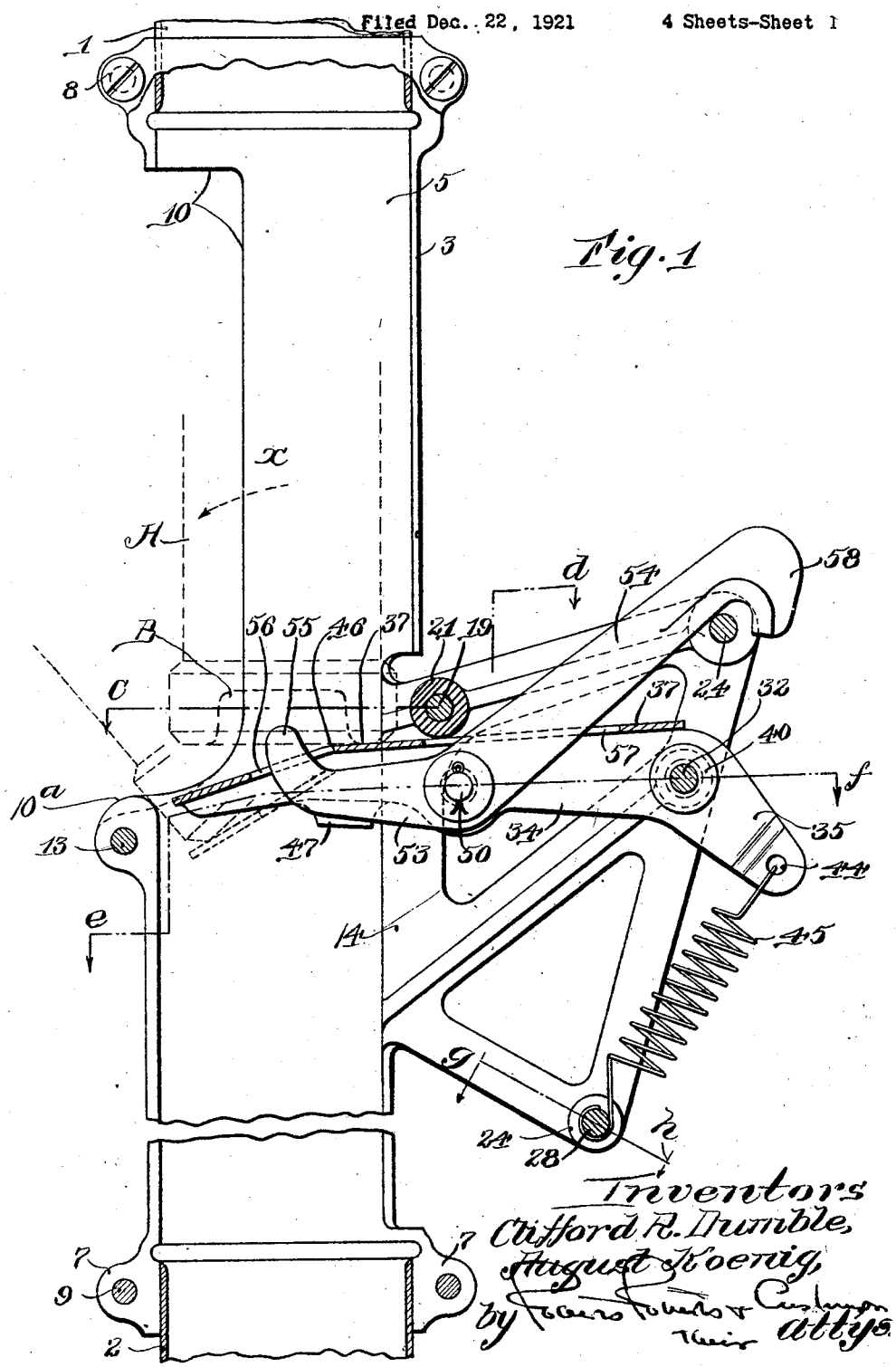
Fig. 1 is an elevation partly in vertical section on line a—b, of Fig. 3 showing the operative parts of the mechanism in waiting position.

Referring to the several figures of the drawing, the carrier separating or assorting device is shown as interposed between ends 1, 2, respectively of sections of an ordinary pneumatic tube system. A tubular structure 3 consisting of a pair of complemental semi-cylindrical members 4, 5, respectively provides a connection between the tubes 1, 2, and a mounting for the working parts. These members 4, 5, at their upper and lower ends are provided with outstanding ears such as 6, 7, bored for the connecting bolts 8, 9, to secure the members 4, 5, together, and to clamp the tubular structure 3 to the ends 1, 2, respectively of the adjacent tube sections. At one side the structure 3 is cut away to provide an elongate discharge opening 10 through which carriers may be laterally ejected from the tube, and the members 4, 5 at a point adjacent to the lower edge of this opening are provided with ears 11, 12 respectively, bored for a bolt 13. Opposite the discharge opening 10, but at a point somewhat below the same, the members 4, 5 are respectively recessed to form an elongated slot 14, from the edges of which preferably integral bracket arms 15, 16 extend in planes substantially parallel to a radius of the axis of the structure 3. These bracket arms may be cut away at 15ª, 15ᵇ, for lightness. Projecting inwardly from the respective bracket arms, are bosses 17, 18, respectively, bored for a connecting bolt 19. Interposed between the adjacent faces of the bosses and surrounding the bolt is a spacer sleeve 20 of steel or other suitable material carrying a buffer member 21 of rubber or other suitable material. At their upper rear corners the bracket members 15, 16, carry a fixed locking element, shown as a pin 24 in bored bosses 22, 23 having aligned openings for the reception of the pin 24, which may be held in proper position by cotters 25 or otherwise. At their lower outer corners the bracket members 15, 16 are furnished with bosses 26, 27, respectively, having openings for the reception of a connecting bolt 28. Mounted upon this bolt between the bosses 26, 27 are a pair of buffer members 29 which may be of rubber or other suitable material. At a point intermediate the pin 24 and the bolt 28 the bracket members have bosses 30, 31 projecting from their inner surfaces, and having openings for the reception of a pin 32, retained in position by cotters 33 or otherwise.

Pin 32 serves as a pivotal support for an abutment lever, see Figs. 1, 3 and 4, comprising the forwardly-directed arm 34 and the rearwardly directed arm 35. This lever may be formed from sheet metal as an integral stamping comprising an upper transverse member 37 and vertically depending side members 38, 39, respectively. These side members are arranged in spaced parallel relation and have integral or attached bearing bushings 40, 41 for the pin 32. The rear ends of the members 38, 39 are preferably bent inwardly into contact at 42, 43, Fig. 4, and have an opening 44 into which is hooked the upper end of a tension spring 45, whose lower end is secured to the bolt 28 preferably at a point between the buffer members 29, Fig. 5. In the normal position of the parts, see Fig. 1, the spring 45 serves to hold the portion 34 of the abutment lever against the buffer sleeve 21. In this position of the parts the surface 37 slopes slightly downward toward the discharge opening 10, arm 34 of the abutment lever projecting forwardly through the slot 14 and across the interior of the tubular structure 3. When the proportions are as shown in the drawings, the lip 10ª of the opening 10 will be slightly above sloped surface 37 of the lever 34, 35. At a point 46 to the rear of the center of the bore of the tubular structure 3, the member 37 of the abutment lever is caused to slope more abruptly toward its outer or free extremity as clearly indicated in Fig. 1. Stop lugs 47 on the lower edges of the members 38, 39 respectively, limit the downward throw of abutment level 34, 35 by contact with the buffers 29. The abutment lever carries a device for latching it substantially in the position of Fig. 1 except upon the approach of one kind of carrier. At a point substantially midway the length of the lever arm 34 and just outside the tubular structure 3 in the normal position of the parts, is secured a bearing pin 50 in bearings such as the bushings 48, 49, integral with or attached to the members 38, 39, and upon this bearing pin is mounted for swinging movement a lever comprising the forward detector arm 53 and the rear latch arm 54. This detector lever 53, 54 lies in a vertical plane intermediate the members 38, 39 and its forward end is bent upwardly to pass through an opening 56 in the member 37 of the abutment lever, said end normally lying substantially in the axial region of the bore of the structure 3 and constituting a detector finger. The arm 54 extends upwardly through an opening 57 in the member 37 of the abutment lever and the rear portion of said arm 54 normally contacts with pin 24 and at its outer extremity terminates in a downwardly directed hook 58. This hook is normally spaced somewhat from the pin 24, but is adapted to take over the pin 24 unless moved relatively to the detector lever, thus serving as positive stop means for limiting movement of the abutment as mentioned below.

In the operation of the device above described, if it be assumed that a carrier A having a hollow head B as indicated in dotted lines in Fig. 1 has passed down the upper tube section 1 and into the tubular structure 3 the shock of impact of the head of such carrier upon the surface 37 of the abutment lever will tend to swing the arm 34 downwardly about the pivot pin 32 as an axis. This movement will be resisted to some extent by the spring 45, which serves as a buffer to absorb a portion of the shock of the blow. Before the arm 34 has swung through any great distance, the hook 58 engages the pin 24 and thus positively prevents further movement of the abutment lever. Since the point of contact of the head of the carrier with the member 37 of the lever is near the rear wall of the member 3 and at one side of the axial center of the carrier, the momentum of such carrier tends to cause the center of gravity thereof to swing about such point of contact as an axis, resulting in motion of the center in the direction of arrow $x$, Fig. 1, and the ejection of the carrier through the discharge opening 10.

The lip 10$^a$ drags against the lower head of the carrier and assists in directing the carrier so ejected. While the position of the lip 10$^a$ in respect to the locked position of the abutment may be varied, the preferred relation is that shown. This discharge of the carrier is the positive result of its own energy and contact with the relatively fixed abutment 37. No auxiliary parts for assisting such action are required or of any advantage; the greater the weight or velocity of the carrier, the greater will be the component of forces causing its ejection from the tube. The downward inclination of surface 37 towards the opening permits a carrier moving with a minimum of velocity to fall through the opening 10, since the center of gravity of the carrier lies beyond the point of support in the direction of the discharge opening.

If, however, a carrier having a solid head approaches the abutment lever while in the position of Fig. 1, the solid head of the carrier first strikes the end 55 of the detector lever, before any portion of the head comes into contact with the abutment lever, and moves the detector lever relatively to the abutment lever. The hook member 58 is normally out of engagement with the pin 24, and is readily lifted by depression of the detector finger 55 relatively to the lever 34. When the solid head carrier strikes the detector finger, the hook 58 is lifted, and as the carrier continues to move downwardly in the tube, it contacts with the abutment lever and swings both levers downwardly on pivot 32 out of the path of the carrier and into the position of Fig. 2. The solid head carrier is thus permitted to pass freely on through the tube 3 and into the lower tube section 2.

In the arrangement shown in Fig. 7, the device is shown as applied to the outside of a continuous length of pneumatic tube, instead of being interposed between adjacent ends of tube sections. As thus arranged the longitudinal continuity of the original tube section need not be disturbed, it being sufficient merely to provide openings 70 and 71 therein corresponding to the openings in the structure 3 which is applied thereto. In Fig. 6 a modified form of abutment lever is shown wherein the lever consists of two independent like members 60, 60$^a$ respectively, which may be suitably secured together in spaced relation by bolts or rivets such as shown at 61, 62. These members 60, 60$^a$ serve to support the pivot pin 50 upon which the detector lever is mounted and are also provided with bearing holes at 64 for the pivot pin 32 upon which the abutment lever turns. In this case the on-coming carrier does not strike upon a transverse surface such as is provided by the member 37 in the preceding arrangement, but contacts with the upper edges 66 of the members 60, 60$^a$, respectively. A two-point contact is thus provided which serves to predetermine the axis about which the carrier will rotate in passing out through the discharge opening, by which the direction of the ejection movement of the carrier is controlled to cause the carrier to be delivered to a branch tube, chute or other receiver placed in relation to the discharge opening.

What we claim is:

1. A separator device for carrier despatch mechanism employing carriers of different forms, and having therein carrier diverting means, comprising a movable abutment element normally arranged to engage the advancing end of a carrier at a point to one side of the center of such end, in combination with an element interlocking with a fixed part of the despatch mechanism for limiting movement of the abutment element when engaged by one form of carrier whereby to cause the trailing end of such carrier to describe an arcuate path having its center at the point of contact of the engaging end of the carrier with the locked abutment.

2. Carrier assorting mechanism for pneumatic despatch tubes comprising an abutment for diverting carriers, in combination with a detector lever mounted to swing about an axis fixed in relation to said abutment, a spring for normally holding said abutment and said lever in predetermined position, and a hook carried by one arm of said lever and engageable with a fixed member for positively limiting movement of said lever.

3. In combination with a guide tube for pneumatic carriers, an abutment lever having a downwardly inclined arm projecting into said tube, means serving yieldingly to retain said arm in a position across the tube, a latch hook pivotally mounted upon said lever, and a fixed pin for engagement by said hook after predetermined yielding motion of said lever.

4. In an assorting mechanism for pneumatic carriers, an abutment lever pivoted intermediate its ends, spring means connected to one arm of the lever for retaining it in normal position, a detector lever pivotally mounted upon the other arm of the abutment lever, said detector lever being provided with a detector finger and a latch hook, and a fixed member engageable by said hook whereby positively to limit the turning of said levers about their respective pivots.

5. Selector mechanism for use with pneumatic tubes comprising a movable abutment normally arranged in the path of carriers, means for interlocking the abutment with a fixed part, said means permitting limited movement of the abutment under the impact of a carrier, and a spring for resiliently absorbing a portion of the force of the blow of a carrier against the abutment.

6. Selector mechanism for assorting carriers of different kinds moving along a guide comprising a pair of spaced parallel bracket members projecting from one side of the guide, a pivot member supported by said brackets, an abutment lever supported to turn about the axis of said pivot member, a spring normally operative to maintain the abutment lever with one of its ends extending across the path of carriers moving along the guide, a rod connecting the bracket members, and a resilient sleeve carried by the rod, said sleeve being disposed in the path of movement of the abutment member when the latter is moved by impact of a carrier whereby resiliently to limit such movement.

7. A carrier selector mechanism for pneumatic tube systems comprising a sleeve engageable with a pneumatic tube, means for clamping said sleeve in fixed relation upon the tube, a pair of spaced bracket members projecting in parallel relation from one side of said sleeve, an abutment lever pivoted to swing in the space between said members, spring means for resiliently retaining said lever in normal position, a latch device carried by said abutment lever and a fixed pin secured in said bracket members and engageable by said latch device, whereby to limit pivotal movement of the abutment lever.

8. Selector mechanism for pneumatic tubes comprising a pair of complemental semi-cylindrical members adapted collectively to constitute a sleeve for connecting spaced ends of a pneumatic tube, means for clamping said semi-cylindrical members together, a bracket projecting from each of said members, said brackets being spaced apart and parallel, an abutment lever pivotally supported between said brackets, a spring connected to one end of the lever normally holding the other end thereof transversely across the path of carriers moving through the connecting sleeve, and a latch carried by the abutment lever engageable with a rod connecting the brackets for normally limiting movement of the abutment lever.

Signed by us at Boston, Massachusetts this eighth day of December 1921.

CLIFFORD R. DUMBLE.
AUGUST KOENIG.